United States Patent [19]

Dyroff et al.

[11] Patent Number: 4,600,750

[45] Date of Patent: Jul. 15, 1986

[54] PROCESS FOR PREPARING POLYMERIC ACETAL CARBOXYLATES

[75] Inventors: David R. Dyroff, Ladue; Edward J. Burke, St. Louis; William Vanderlinde, Creve Coeur; Thomas W. Backes, St. Louis, all of Mo.

[73] Assignee: Monsanto Company, St. Louis, Mo.

[21] Appl. No.: 769,839

[22] Filed: Aug. 27, 1985

[51] Int. Cl.$^4$ ............................ C08G 6/00; C08L 61/02
[52] U.S. Cl. ...................................... 525/398; 525/400; 528/245
[58] Field of Search ................. 525/398, 400; 528/245

[56] References Cited

U.S. PATENT DOCUMENTS 4,302,564 11/1981 Dyroff et al. ...................... 525/398

*Primary Examiner*—Lucille M. Phynes
*Attorney, Agent, or Firm*—R. Loyer; J. Logomasini; Monsanto Company

[57] ABSTRACT

An improved process is provided for producing polymeric acetal carboxylate salts useful as detergent builders. The process comprises polymerization of an alkyl glyoxylate, optionally with one or more comonomers; addition of stabilizing endgroups; and saponification of the polymeric ester to produce the polymeric acetal carboxylate salts. Active yield is improved by reducing the number of polymer chains with unstable temporary endcaps entering the saponification step.

39 Claims, 1 Drawing Figure

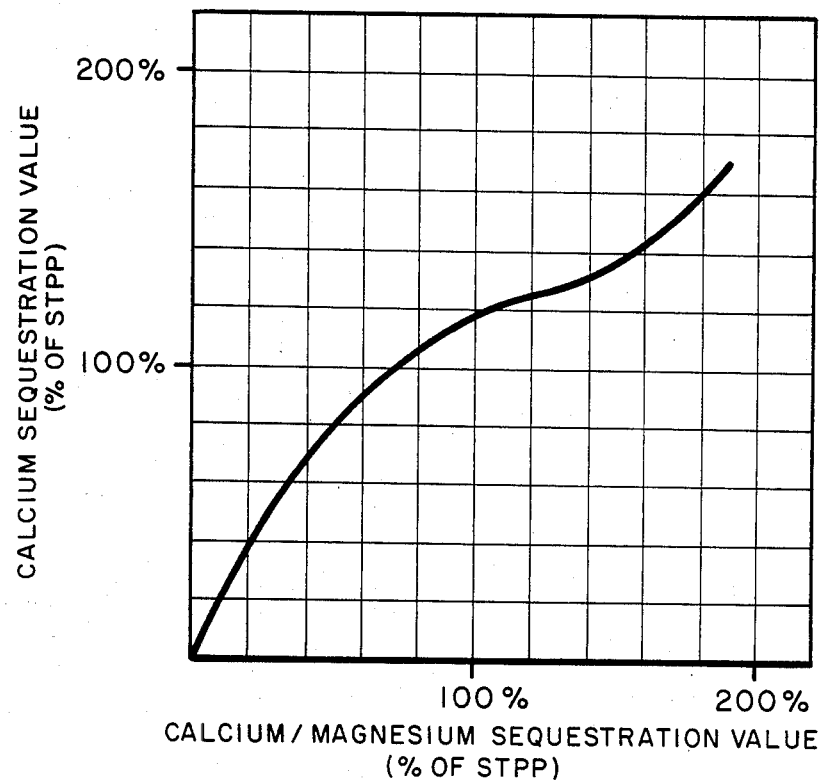

PROCESS FOR PREPARING POLYMERIC ACETAL CARBOXYLATES

This invention relates to an improved method of preparing polymeric acetal carboxylates, which are useful as complexing agents and detergency builders.

BACKGROUND OF THE INVENTION

The property possessed by some materials of improving detergency levels of soaps and synthetic detergents and the use of such materials in detergent compositions is known. Such cleaning boosters are called "builders", and such builders permit the attainment of better cleaning performance than is possible when so-called unbuilt compositions are used. While the mechanisms by which builders perform their function are only partially understood, it is known that good builders must be able to sequester most of the calcium and/or magnesium ions in the wash water since these ions are detrimental to the detergency process.

Polymeric acetal carboxylates have been found to be useful as detergency builders. In addition to providing effective sequestration of calcium and magnesium ions, these materials fulfill a need which exists in some geographical areas for effective builders which do not contain phosphorus and which are environmentally acceptable.

Polymeric acetal carboxylate compositions have been disclosed in U.S. Pat. No. 4,144,226 issued Mar. 13, 1979, in U.S. Pat. No. 4,204,052 issued May 20, 1980, in U.S. Pat. No. 4,303,777 issued Dec. 1, 1981, in U.S. Pat. No. 4,315,092 issued Feb. 9, 1982, and in U.S. patent application Ser. No. 627,262 filed July 2, 1984. The use of such polymeric acetal carboxylates in detergent compositions is disclosed in U.S. Pat. No. 4,146,495 issued Mar. 27, 1979. Processes useful in the preparation of such polymeric acetal carboxylates are disclosed in U.S. Pat. No. 4,140,676 issued Feb. 20, 1979, in U.S. Pat. No. 4,201,858 issued May 6, 1980, in U.S. Pat. No. 4,224,420 issued Sept. 23, 1980, in U.S. Pat. No. 4,225,685 issued Sept. 30, 1980, in U.S. Pat. No. 4,226,959 issued Oct. 7, 1980, in U.S. Pat. No. 4,226,960 issued Oct. 7, 1980, in U.S. Pat. No. 4,233,422 issued Nov. 11, 1980, and in U.S. Pat. No. 4,233,423 issued Nov. 11, 1980.

Although the methods for preparation of polymeric acetal carboxylates disclosed in the above patents and patent application are effective in producing such compositions, it has been found that the active yield of the polymer salt obtained by using these methods is less than about 75% of theoretical, based upon the amount of monomeric starting material employed. While "yield" is reported for the amount of polymer product in several of the above patents, these yields were calculated on the basis of the total weight of the solid compositions recovered. When the active yields of the material produced by the procedure of the examples in the patents listed above are calculated using techniques described herein, it is found that the active yield of the desired polymer salt was in each case less than 75% of the theoretical, based upon the amount of monomer starting material employed.

This invention provides a process for production of a polymeric acetal carboxylate with an improved active yield.

SUMMARY OF THE INVENTION

This invention is a process to produce polymeric acetal carboxylates with an improved active yield. This improvement in the active yield results from control of the process to minimize unstable temporary endcaps. An "unstable temporary endcap" is a group present at the end of a polymer chain of the polymeric acetal ester which because of its presence at the end of a polymer chain, prevents the attachment of a stabilizing endgroup at that end of the chain and which allows significant depolymerization to occur during subsequent processing, particularly in the saponification step. Unstable temporary endcaps on the polyacetal carboxylates are usually formed inadvertently and can result from a variety of sources. As a result, various parameters must be controlled in the manufacturing process in order to minimize unstable temporary endcaps and thus produce the improved active yields.

The existence of these unstable temporary endcaps was not recognized in the prior art, nor was the dramatic loss in active yield that can result from the presence of rather small amounts of unstable temporary endcaps. Similarly, the prior art did not recognize the sources and causes of unstable temporary endcaps, or what measures may be taken to control the amount of unstable temporary endcaps which reaches the saponification step.

In accordance with this invention there is provided an improved process comprising:

(a) bringing together in a reaction zone under polymerization conditions an ester of glyoxylic acid and a polymerization promoter, to produce a polymeric acetal ester;

(b) adding to said polymeric acetal ester a stabilizing endgroup precursor to add stabilizing endgroups to the polymeric acetal ester to produce a stabilized polymeric acetal ester; and (c) saponifying said stabilized polymeric acetal ester with an alkali metal hydroxide to produce the corresponding alkali metal polymeric acetal carboxylate salt; wherein the improvement comprises providing step (c) with a polymer wherein the number of polymer chains which contain at least one unstable temporary endcap does not exceed about 25% of the total number of polymer chains entering step (c), whereby the active yield of alkali metal polymeric acetal carboxylate salt is at least about 75% based upon the amount of said ester of glyoxylic acid.

A stabilizing endgroup stabilizes the polymer against depolymerization in alkaline solution. A stabilizing endgroup should at a minimum impart sufficient stability so that, in an aqueous solution of 0.5 molar sodium hydroxide containing 10 grams per liter of polymeric acetal carboxylate, the average chain length of the polymeric acetal carboxylate will be reduced by less than 50 percent, as determined by Proton Magnetic Resonance (PMR), after 1 hour at 20° C. Since saponification of the polymer will usually be carried out under more vigorous conditions than these, it is preferred that the stabilizing endgroup provide substantial stabilization against depolymerization under saponification conditions.

"Active yield" as used herein means the yield of active polymer expressed as a percentage of the theoretical yield of active polymer based upon the amount of monomer employed as will be more particularly described below.

DESCRIPTION OF THE INVENTION

The process of this invention produces polymeric acetal carboxylates, represented by the following formula:

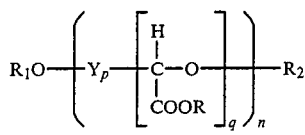

where Y is one or more comonomers randomly distributed along the polymer chain, where p is 0 or 1 and the product of q and n averages at least 4; $R_1$ and $R_2$ are individually stabilizing endgroups; and R is selected from the group consisting of alkali metal, ammonium, tetralkyl ammonium, and alkanolammonium groups.

These polymeric acetal carboxylates and their preparation and use are described in U.S. Pat. No. 4,144,226, issued Mar. 13, 1979; U.S. Pat. No. 4,146,495, issued Mar. 27, 1979; and U.S. Pat. No. 4,204,052 issued May 20, 1980, which are incorporated herein by reference. Alkali metal salts of these polymeric acetal carboxylates are produced by saponification of the corresponding ester. Other salts can be prepared from the alkali metal salts by ion exchange techniques.

It has been found that very significant yield losses occur in the saponification step and subsequent processing if a significant proportion of the ester polymer chains entering that step contain at least one unstable temporary endcap. To obtain an active yield greater than about 75% of theory, based upon the amount of alkyl glyoxylate used to prepare the polymer, it is necessary that not more than about 25% of the polymer chains subjected to saponification contain one or more unstable temporary endcaps. Preferably the percentage of polymer chains with at least one unstable temporary endcap should be less than about 15%, more preferably less than about 5%, and even more preferably it should be less than about 1%. Of course, in order to obtain the improved active yields of this invention, the other conditions of the process must also be within acceptable limits. It is believed that a failure to control the number of unstable temporary endcaps has been a critical and unrecognized barrier preventing the attainment of active yields of about 75% or higher in the prior art.

For any given run in which the polymeric acetal carboxylate of this invention is prepared, the percentage of polymer chains subjected to saponification which contain one or more unstable temporary endcaps can be estimated reasonably accurately by either of two general approaches. In the first approach, the percentage conversion (Cp) of monomeric glyoxylate ester to polymeric acetal carboxylate just prior to reaction of the mixture with the stabilizing endgroup precursor is determined by NMR analysis of a sample of the reaction mixture stabilized against rapid depolymerization by addition of diethyl aluminum chloride at reaction temperature, diluted with methylene chloride sufficiently to obtain sharp NMR peaks, and then adjusted to ambient temperature. Another sample of reaction mixture is taken just prior to the saponification step, treated with excess stabilizing endgroup precursor under conditions sufficient to ensure essentially complete reaction of all unstabilized chain ends not blocked with an unstable temporary endcap, and saponified. The resulting polymeric acetal carboxylate is isolated, and an active yield is determined for this sample using techniques described herein below. Monomer input for calculation of this active yield ($Y_{ac}$), corresponding to completion of the polymer stabilizing reaction, is calculated by multiplying the total monomer input to the run by suitable fractions to correct for prior removal of samples as well as the proportion of the total remaining reaction mixture taken for this analysis. The percentage of chains containing an unstable temporary endcap ($P_t$) is then estimated to fall within a range as follows:

$$(C_p - Y_{ac}) \leq P_t \leq (100 - Y_{ac})$$

This estimate assumes that losses of active yield due to depolymerization during endcapping (step b) and destruction of properly stabilized chains during saponification (step c) are each negligible, which is normally true under the conditions disclosed herein. The reason for the range of uncertainty is that under some conditions, monomer not yet converted to polymer prior to reaction of the mixture with the stabilizing endgroup precursor may be at least partially converted in the subsequent steps to one or more species which contribute some activity to the recovered final product. Since, under the more preferred process conditions, $C_p$ is generally about 90% or higher, the range of uncertainty does not exceed about 10%. If the conditions of a run are such that it is known that the conversion of unstabilized but unblocked chain ends to stabilizing endgroups will go essentially to completion, the separate determination of $Y_{ac}$ is unnecessary, and $P_t$ can simply be estimated to fall within the following range, where $Y_a$ is the active yield for the run:

$$(C_p - Y_a) \leq P_t \leq (100 - Y_a)$$

An alternate approach for estimating $P_t$ is to determine $Y_a$ and $Y_{ac}$ (if different from $Y_a$) as described above, and in addition determine by any appropriate method of analysis, the total percentage ($P_l$) of the monomer input which ends up as monomeric glyoxylate, glycolate, and oxalate in the total reaction mixture following saponification. Then $P_t$ is estimated by the following equation:

$$P_t = P_l - (Y_{ac} - Y_a)$$

This again assumes that conditions have been chosen under which depolymerization during endcapping and destruction of properly stabilized chains during saponification are each negligible. For runs in which such assumptions are not applicable, appropriate modifications of the above methods for estimating $P_t$ can be devised by one skilled in the art in view of the present disclosure.

Included within the scope of the present invention are any number of embodiments wherein the saponification step (step c above) is provided with a polymer wherein the number of polymer chains containing at least one unstable temporary endcap does not exceed about 25% of the total number of polymer chains, whereby the product of the saponification step is produced with an active yield of at least 75% based upon the starting glyoxylic acid ester. These embodiments will usually include one or more of the following three general steps:

1. Providing starting materials in which the content of unstable temporary endcap precursors is low.

2. Providing process conditions which minimize the formation of unstable temporary endcaps during processing.

3. Replacing unstable temporary endcaps with stabilizing endgroups prior to subjection of the polymeric ester to saponification.

An unstable temporary endcap precursor is a molecule other than a required starting material or intermediate which reacts to produce an unstable temporary endcap. Any number of unstable temporary endcap precursors in the starting materials could adversely affect the active yield, depending upon the choice of endgroup and the other process conditions. It is only necessary that the unstable temporary endcap precursor react to produce a structure at the end of a polymer chain which prevents attachment of the desired stabilizing endgroup at that end of the chain and allows significant depolymerization during saponification and/or product recovery. To determine whether a given molecule is an unstable temporary endcap precursor when introduced with a particular starting material, it is only necessary to conduct a pair of runs which are identical in all respects except that the suspected unstable temporary endcap precursor is added to only one of the runs. For both runs, $P_t$ is estimated as described above. If the estimated value of $P_t$ (or its estimated upper limit) is significantly higher in the run to which the suspect molecule was added, that molecule is confirmed to be an unstable temporary endcap precursor, when introduced under the conditions of the test runs. To insure that misleading results are not obtained in such a test, it is important to insure that the quality of the monomer employed in each of the pair of runs is sufficiently the same to begin with. This is best accomplished by dividing a single uniform lot of freshly distilled monomer between the two runs. It is also necessary to select a level of addition of the suspect molecule which would be sufficient to allow detection of its operation as an unstable temporary endcap precursor but insufficient to produce other gross effects upon the process such as completely stopping one of the desired reactions, etc. Typically, a level of about 0.001-0.002 moles per mole of alkyl glyoxylate monomer is appropriate.

Using the method described above, it was found that carboxylic acids introduced into the polymerization step with the alkyl glyoxylate monomer are unstable temporary endcap precursors which are converted nearly quantitatively to unstable temporary endcaps. Thus, the introduction to the polymerization zone of only 0.001 mole of a carboxylic acid per mole of monomer can cause the active yield to drop about 10% when the number averabe chain length of the polymer is about 100. It is believed that under typical base catalyzed polymerization conditions, a carboxylic acid, $R_3COOH$ is converted to a carboxylate ion to which monomer molecules are then added to produce polymer chains which are then converted to the following structure during endcapping, in the case of a homopolymer:

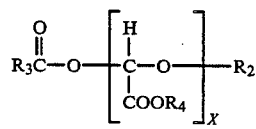

where $R_3$ can be any number of inert or reactive groups such as for example H, alkyl,

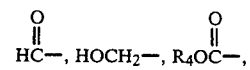

halogenated alkyl, or the like, $R_4$ is an alkyl group, having from 1 to 4 carbon atoms, $R_2$ is a stabilizing endgroup, and X is the number of repeating units in the chain. During saponification such chains suffer rapid hydrolytic attack at the carbonyl group adjacent to $R_3$ to produce a hemiacetal structure at that chain end. The hemiacetal terminated chain then depolymerizes under the saponification reaction conditions. Further such depolymerization may occur during product recovery.

Carboxylate salts having appreciable solubility in the polymerization reaction mixture are also expected to be temporary endcap precursors in view of the above described behavior of carboxylic acids. Also, hemiacetal type structures formed between carboxylic acid (or carboxylate salts) and the monomer prior to the polymerization step are just as harmful as free carboxylic acids. For purposes of this disclosure, the term "reactive derivatives of carboxylic acids" shall refer to carboxylate salts with sufficient solubility to react with alkyl glyoxylate monomer under polymerization conditions, hemiacetals formed by reaction of carboxylic acid (or carboxylate salts) and alkyl glyoxylate monomer, i.e. structures such as

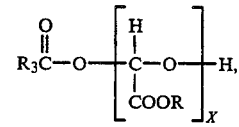

and the like. Also the term carboxylic acid refers not only to simple carboxylic acids but also to any number of complex molecules containing the group —COOH as illustrated above.

Because such small amounts of unstable temporary endcap precursors can exert such large effects upon active yield, very low levels of such precursors must be maintained in the starting materials in order to prevent large yield losses under many conditions. Thus, it is preferred to maintain the total amount of all unstable temporary endcap precursors, in all starting materials combined below 0.001 mole per mole of alkyl glyoxylate monomer, more preferably below 0.0004 mole per mole. It is even more preferred to maintain this total below 0.0002 mole per mole of alkyl glyoxylate monomer.

In order to meet the above limits on unstable temporary endcap precursors in the starting materials, it is preferred that the monomer contain less than 0.1 mole % of unstable temporary endcap precursors, more preferably less than 0.04 mole %. In particular, it is preferred that the monomer contain less than 0.1 mole % of carboxylic acids or reactive derivatives of carboxylic acids, more preferably less than 0.04 mole %. It is particularly difficult to achieve such low levels of carboxylic acids and their reactive derivatives in alkyl glyoxylate monomer since they can be readily formed from the monomer during storage by such reactions as hydrolysis, oxidation, Cannizzaro reaction and oxygen induced free radical chain decomposition reactions. The above mentioned reactions produce such everyday carboxylic acids as formic acid, glyoxylic acid, oxalic acid, monoalkyl oxalate, glycolic acid, and their reactive derivatives. Among the means useful in maintaining low levels of carboxylic acids and reactive derivatives thereof in the monomer are avoidance of oxygen exposure, minimization of water content, minimization of storage time, and minimization of temperature during storage or handling. While many carboxylic acids can be effectively separated from the monomer by distillation, low boiling carboxylic acids are very difficult to remove in this manner due to strong chemical interactions with the monomer during distillation. Therefore, conditions for minimization of formation of carboxylic acids are preferably maintained both before and after the final distillation of the monomer. It is most preferred to avoid storage of the monomer altogether following its final distillation by distilling it directly into the polymerization zone.

In the case of unstable temporary endcap precursors other than carboxylic acids, these can be identified by the method described above and once identified appropriate methods to maintain low levels of them in the starting materials can be devised by one skilled in the art in view of the present disclosure.

Formation of unstable temporary endcaps can occur in any number of ways during processing, even in the absence of unstable temporary endcap precursors in the starting materials. To determine whether a given processing condition results in an increased amount of formation of unstable temporary endcaps during processing, it is only necessary to conduct a pair of runs which are identical in all respects except that the particular processing condition under study is present in only one of the runs or is present to a known increased degree in one of the runs. For both runs, $P_t$ is estimated as described previously. If the estimated value of $P_t$ (or its estimated upper limit) is significantly higher in the run in which the processing condition under study is present to the greater degree, then it is confirmed that that processing condition can result in increased formation of unstable temporary endcaps. In some cases, the resulting increase in $P_t$ can be confirmed by direct analysis.

An example of a reaction which has been discovered to produce unstable temporary endcaps during processing, even in the absence of unstable temporary endcap precursors, is as follows:

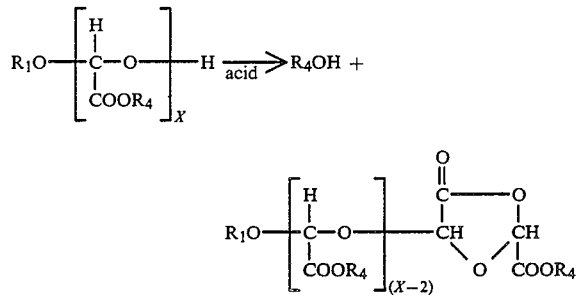

where $R_1$ is a stabilizing endgroup, $R_4$ is an alkyl group having from 1 to 4 carbon atoms, and X is the number of repeating units in the chain. The resulting ring structure is directly detectable by NMR analysis at relatively high levels. This structure, during saponification, suffers rapid hydrolytic attack at the carbonyl group incorporated in the ring to produce a hemiacetal structure at that end of the chain, which under the saponification reaction conditions then allows the chain to depolymerize. Intermolecular reactions analogous to the above intramolecular reaction may also produce unstable temporary endcaps during processing. For both the intramolecular and the intermolecular reaction, one way to minimize the resulting formation of unstable temporary endcaps is to avoid long hold periods after the addition of an acidic endcapping catalyst and before the addition of the stabilizing endgroup precursor. Since processing conditions vary widely, it is not possible to describe here all such processing conditions resulting in formation of unstable temporary endcaps or appropriate means of minimizing all such reactions. However, by using the methods described herein, one skilled in the art can identify such adverse conditions or reactions by routine experimentation. Once this has been accomplished, appropriate means of minimizing the resulting formation of unstable temporary endcaps should be apparent.

It is preferred to select process conditions which limit such formation of unstable temporary endcaps to less than 0.001 mole per mole of glyoxylate monomer, more preferably less than 0.0002 mole per mole of glyoxylate monomer.

By methods described herein, it is possible to determine the level of unstable temporary endcaps in any particular process and to obtain considerable information relating to their origin, conditions of formation, structure, etc. It is contemplated that under some processing conditions it may prove more convenient to introduce special steps for removing unstable temporary endcaps prior to the saponification step rather than relying only upon prevention of their formation. The effectiveness of such steps can be determined by routine experimentation using the methods described herein. Therefore, such steps are considered to be within the scope of this invention.

The above described three general approaches for reducing the number of temporary endcaps in the polymer entering the saponification step can be used individually or in various combinations to obtain the improved active yields of the present invention. The best selection of approaches will depend upon other process conditions such as the source of the monomer, the choice of stabilizing endgroup, conditions of attachment of stabilizing endgroups, etc. The best selection for any particular case can be determined by routine experimentation in view of the present disclosure.

With these principles in mind, the process will be discussed in detail below.

Polymeric acetal carboxylates are prepared from any number of esters of glyoxylic acid as a starting material. Suitable esters include those having from 1 to about 4 carbon atoms in the alkoxy group, such as methyl, ethyl, propyl, isopropyl, butyl, isobutyl and the like. Methyl and ethyl esters are preferred and the methyl ester is especially preferred. Such esters can be prepared by any process which results in sufficient ester purity, for example by oxidation of a glycolate ester followed by recovery of the alkyl glyoxylate from the reaction mixture, predominantly in the form

HCCOE, where E is an alkyl group having 1 to 4 carbon atoms. Glyoxylic acid esters may polymerize upon storage. If the ester has polymerized during storage, it is preferred that this crude, polymerized ester be depolymerized and purified prior to use. This can be accomplished in a number of ways, such as by distillation.

Various comonomers can optionally be copolymerized with the alkyl glyoxylate to form the polymer product of the present invention. It is only necessary that the comonomer does not inhibit polymerization or cause the polymer to depolymerize during the ester saponification step. Suitable comonomers include: epoxy compounds such as ethylene oxide, propylene oxide, and the like; and aldehydes such as formaldehyde, acetaldehyde, and the like. Comonomers having from 1 to 4 carbon atoms are preferred. If desired, mixtures of two or more comonomers can be polymerized with the alkyl glyoxylate to form terpolymers or more complex polymeric structures.

Although there is theoretically no upper limit to the ratio of the moles of comonomer or comonomers to the moles of alkyl glyoxylate incorporated into the polymer, when this mole ratio is greater than about 1:1, the polymer salt frequently loses much of its effectiveness as a chelant, sequestrant and detergent builder. This is particularly true when the comonomer contributes no carboxylate groups to the polymer salt. It is preferred that the mole ratio of comonomer to glyoxylate be less than about 0.2 to 1, and it is especially preferred to incorporate no comonomer at all into the interior of the polymer chains. On the other hand, in certain cases, a small amount of comonomer may be advantageous for providing special properties to the polymer, for example, improved biodegradability.

The glyoxylate monomer, and any comonomers are brought together under polymerization conditions, in the presence of one or more polymerization promoters. A polymerization promoter can be a polymerization initiator or a polymerization catalyst, or a mixture thereof. A polymerization initiator is a species involved in starting a polymer chain, that is incorporated into the chain. A polymerization catalyst is a species that accelerates the polymerization reaction without becoming permanently incorporated into the polymer chain.

Active yield can be no higher than the percent conversion of glyoxylate monomer to polymeric ester. Although some additional conversion can occur during the polymer stabilization step under some circumstances, most of the conversion of glyoxylate monomer to polymeric ester occurs during the polmerization step. It is preferred that the ultimate conversion of glyoxylate monomer to polymeric ester be at least 95%, even more preferably at least 98%. These high conversions of glyoxylate monomer to polymeric ester not only favor a higher active yield, but also result in less unconverted monomer being available for various side reactions. Reducing the extent of any side reactions results in improved product quality and lower consumption of other starting materials.

Conversion of monomer to polymer can be affected by a large number of reaction parameters such as temperature, degree of dilution, reaction time, level of active catalyst, chain length distribution, choice of solvent, choice of catalyst, and other variables. Selection of an appropriate combination of such variables to achieve a high conversion can be accomplished by routine experimentation in view of the present disclosure.

A number of polymerization initiators can be used, including but not limited to hydroxylic species such as water and alcohol, for example methanol, ethanol, dodecanol, isopropanol, and the like; alkyl glycolates; dialkyl alkyltartronates; and other polymerization initiators known to one skilled in the art. It is sometimes advantageous to use a polymerization initiator which initiates the growth of the polymer chain in such a way that a stabilizing endgroup is simultaneously formed at the initiated end of the polymer chain. Such polymerization initiators that also produce a stabilizing end group include but are not limited to alkyl glycolates, dialkyl alkyltartronates, and alcohols. Lower alcohols are preferred and methanol is particularly preferred. Since hydroxylic species act as polymerization initiators, the best control over polymerization is achieved when the amount of a hydroxylic species present in any of the various starting materials, catalysts and solvents is minimized, so that deliberate addition of polymerization initiators is required in order to initiate the desired number of polymer chains.

Any number of polymerization catalysts can be used to accelerate the polymerization. Cationic polymerization with catalysts such as boron trifluoride etherate is possible, however, better results have been obtained by anionic polymerization using basic catalysts such as alkali metal hydroxides, amines, sodiomethylmalonate esters, alkali metal alkoxides, and the like. Trialkylamines are preferred, and triethylamine is particularly preferred. In general, a very small amount of basic catalyst is required, and the optimum amount of any given catalyst can be determined by routine experimentation. If the amount used is too small, the polymerization will be too slow and may stop altogether. If an excessive amount is used, higher relative amounts of undesirable side reactions can be promoted.

It is preferred to add the glyoxylate monomer and any comonomers steadily to a reaction zone containing the polymerization promoter rather than adding the polymerization promoter to a zone where a large amount of monomer has been accumulated. Addition of the monomer results in better control of the reaction temperature since the polymerization is very rapid and highly exothermic. While higher polymerization temperatures are possible, it is preferred that the polymerization temperature be limited to a range of about 0°-50° C. by means of cooling and by control of the monomer addition rate. Monomer addition rate can vary widely as long as adequate control of temperature is maintained. It is also preferred that the temperature of the polymerization reaction mixture at the end of polymerization be reduced by cooling to the range of about 0°-30° C. since the equilibrium conversion of monomer to polymer increases as the temperature decreases.

Alkyl glyoxylate monomer is highly reactive with moisture and oxygen and must therefore be prevented from contacting air prior to or during its use in the polymerization. Because it is so reactive, it is preferred to use freshly distilled monomer. It is especially preferred to distill the monomer, condense it, and then add it directly to a reaction zone containing the polymerization promoter with no more storage or accumulation than is required for pumping and for supplying reflux. Herein such a procedure is referred to as "distilling the monomer directly into a reaction zone containing the polymerization promoter."

It is preferred to include a solvent in the reaction mixture to maintain an acceptable viscosity. Any number of solvents can be used, such as alkylnitrile, halogenated hydrocarbon, dimethyl sulfoxide, acetone, and the like. It is only necessary that the solvent be miscible with the polymer and other reactants, while not entering into unwanted side reactions. It is preferred to use the same solvent for both the polymerization and the polymer stabilization step in order to avoid excessive costs associated with solvent recovery, purification, and recycle. Methylene chloride is a particularly preferred solvent because of its relatively easy removal from the polymer during the saponification. The amount of solvent used can vary widely and the optimum amount can be determined by routine experimentation. Too little solvent results in excessive viscosity of the reaction mixture, sluggish reactions, etc. Too much solvent results in excessive reaction volume, excessive solvent recovery costs, and an undesirably low conversion of monomer to polymer during the polymerization step.

Polymerization can be batch or continuous. In either case, sufficient time should be provided following mixing of the components and attainment of the final reaction temperature to allow the conversion of monomer to polymer to reach the desired level. Usually the desired level would be near the equilibrium conversion corresponding to the final conditions. The time required to reach equilibrium varies with such conditions as temperature, viscosity, and catalyst level. The optimum reaction time can be determined for any particular combination of conditions by routine experimentation. Satisfactory results are obtained at atmospheric pressure although higher or lower pressures could be used.

Control of the polymerization step to produce an appropriate chain length is desired. In the case of sodium glyoxylate homopolymer, as the number of glyoxylate units per polymer chain increases, the sequestration efficiency of the polymer increases. However, the rate at which sequestration efficiency increases with the increasing polymer chain length becomes very small at very high chain lengths. Furthermore, excessively high chain length may result in some undesirable effects such as excessive viscosity during processing or an undesirably slow rate of dissolution when the polymer salt is dissolved in water. For these reasons, a number average chain length in the range of about 5-200 glyoxylate units is preferred, and a number average chain length in the range of 25-150 is particularly preferred. Similar considerations apply to polymers containing one or more comonomers. The chain length can be controlled by various means known to one skilled in the art. It is particularly important to control the amount of polymerization initiators present in the system during polymerization, as the average chain length tends to decrease with increases in the amount of polymerization initiator present.

It is important to control the starting materials, initiators, catalysts, solvents, etc. entering the polymerization process to ensure that the number of unstable temporary endcap precursors entering the system is low. It is also important to control the conditions of the polymerization to minimize the formation of unstable temporary endcaps, as is described above.

After the polymeric acetal ester has been produced, the next step is the stabilization of the polymer by adding one or more stabilizing endgroups. Any number of reactive compounds can be reacted with the polymeric ester to provide the stabilizing end-groups. Such stabilizing endgroup precursors include but are not limited to alkyl vinyl ethers, other reactive substituted olefins, alcohols, epoxides, alkyl halides, allyl halides, acetals, alkyl sulfates, benzyl halides, and the like. In each case, catalysts and/or other additional reagents are likely to be required to promote the reaction. The preferred reactive compounds for stabilization of the polymeric ester are alkyl vinyl ethers. Lower alkyl vinyl ethers such as $C_{1-4}$ alkyl vinyl ethers are preferred, and ethyl vinyl ether is particularly preferred. Since alkyl vinyl ethers are preferred, the stabilization step will be discussed with respect to alkyl vinyl ethers specifically. Similar considerations apply when other agents are used to produce the stabilizing endgroup, and optimum conditions, ranges, and catalysts are either known to one skilled in the art or could be determined by routine experimentation.

When an alkyl vinyl ether is added to the polymer ester to provide stabilizing endgroups, an acidic catalyst is used to promote the reaction. Any number of acidic compounds can be used, such as hydrogen halides, trifluoroacetic acid, phosphoric acid, other protic acids, acidic metal halides, alkyl aluminum halides, trialkyl aluminum compounds, alkyl aluminum alkoxides, other organo aluminum compounds, some other Lewis acids, and various mixtures of these compounds. Organo aluminum compounds are preferred and alkyl aluminum chlorides are particularly preferred. The optimum amount of any particular catalyst can be determined by routine experimentation. The amount used must exceed the amount required to neutralize all basic materials which might be present such as basic polymerization catalyst, basic stabilizers present in the alkyl vinyl ether, etc. As the amount of acidic catalyst is increased, the polymer stabilization reaction is accelerated. However, excessive amounts of some catalysts can promote excessive amounts of undesirable side reactions. For this reason it is preferred that the amount of acidic catalyst employed be not greater than about 0.001 mole per mole of monomer added to the polymerization step when the acidic catalyst is an alkyl aluminum chloride.

When an alkyl vinyl ether is added to the polymeric ester to provide stabilizing endgroups, the reaction temperature should generally be within the range of 0°-50° C. Lower temperatures result in an excessively slow reaction, and higher temperatures tend to promote unwanted side reactions. The range 15°-50° C., is preferred and the range 20°-35° C. is particularly preferred. Satisfactory results are obtained at atmospheric pressure, although higher or lower pressures may be used.

The amount of alkyl vinyl ether used can vary widely, and the optimum amount can be determined by routine experimentation. If the amount is too small, an excessive number of polymer chains will remain unstabilized resulting in a low yield of the polymer salt. If the amount is too high, some of the alkyl vinyl ether is wasted, and unwanted side reactions may be promoted. The amount of alkyl vinyl ether required is usually in excess of one mole per mole of polymer chains because of side reactions which consume the alkyl vinyl ether, because many chains react with alkyl vinyl ether at both ends, and because under many conditions a single chain end can react with two or more molecules of alkyl vinyl ether. It is preferred to avoid local or transient excesses of basic materials during the stabilization of the polymeric ester, because these conditions would tend to promote partial depolymerization prior to stabilization.

Considerable variation is possible in the order of addition of the various materials introduced during polymer stabilization with alkyl vinyl ether. The optimum order of addition is dependent upon the other reaction conditions and can be determined for any particular case by routine experimentation. Sufficient reaction time must be provided to permit a high percentage of the unstabilized polymer chain ends to react. Usually a total reaction time of about 7 hours is sufficient, but the optimum reaction time must be determined experimentally for any given combination of the other conditions. During polymer stabilization, operation can be batch or continuous and the rates of addition of the reactants and catalysts can vary widely. It is preferred to use the same solvent used in the polymerization step although it is possible to change the solvent. The level of solvent is preferably that used in polymerization or a little higher to facilitate mixing of the reactants. While exclusion of oxygen and moisture is somewhat less critical than it is during monomer preparation and polymerization, it is still preferred to avoid introduction of oxygen and moisture. Therefore, contact of the reaction mixture with air should be avoided. As discussed above, it is important to avoid introduction of unstable temporary endcap precursors during polymer stabilization and to chose reaction conditions which minimize the formation of unstable temporary endcaps.

If optimum conditions are used for each step of the process, and if the described measures are taken to avoid formation of unstable temporary endcaps or to either convert the unstable temporary endcaps or to replace them with stabilizing endgroups, stabilized polymeric ester can be produced in which the number of polymer chains containing at least one unstable temporary endcap does not exceed 25% of the total number of polymer chains produced. Preferably not more than 15% of the polymer chains will contain an unstable temporary endcap, more preferably not more than 5%, even more preferably not more than 1%. It is essential that the number of unstable temporary endcaps be held to a minimum, because the saponification step takes place under conditions which can cause depolymerization of any polymer chain containing an unstable temporary endcap.

The stabilized polymer ester is saponified using a strong base such as lithium hydroxide, sodium hydroxide, potassium hydroxide, and the like, or mixtures thereof, to obtain the corresponding polymer salts. Other salts can be prepared from the alkali metal salts using conventional ion exchange techniques. The preferred strong bases for the saponification are sodium hydroxide and potassium hydroxide, and sodium hydroxide is especially preferred.

During saponification of the stabilized polymeric ester, it is preferred to maintain basic conditions at all times in all locations involved in the reaction in order to minimize such side reactions as acetal hydrolysis. This can be accomplished by using adequate agitation and excess base. An excess of about 5-50% over the theoretical amount of base is especially preferred, since some side reactions are known to consume amounts of base beyond the amount required for the reaction of all the ester groups. On the other hand, it is also preferred to avoid excessively high concentrations of base since these can also promote unwanted side reactions. To provide such conditions, it is preferred to use a process in which the stabilized polymeric ester and the alkali metal hydroxide are added to the reaction zone simultaneously. If a batch process is used, addition of some base prior to the start of addition of the stabilized polymeric ester is required in order to maintain the desired excess of base throughout the reaction.

It is preferred to add the stabilized polymeric ester directly to the saponification zone without prior separation from any solvent. Separation of solvent during or after the saponification step is advantageous because prior removal produces a polymeric material which is very sticky, viscous, and difficult to handle. It has been shown that the solvent and the saponification conditions can be selected in such a way that excessive side reactions involving the solvent are avoided during saponification.

Temperature during saponification can vary widely, depending upon the other conditions. Temperatures in the range from about 35° to about 70° C. are preferred and temperatures in the range of 45°-65° C. are particularly preferred. If a volatile solvent such as methylene chloride is present in the stabilized polymeric ester solution fed to saponification, it is preferred to use a temperature high enough and a pressure low enough that the solvent flashes off almost immediately upon entering the saponification zone. With methylene chloride, atmospheric pressure is satisfactory. Sufficient reaction time must be provided for the saponification reaction to go essentially to completion. With appropriate selection of the other conditions, the reaction can be completed in four hours or less. The level of water present during saponification can be varied widely and the optimum level for use with any particular combination of the other conditions can be determined by routine experimentation. An excessive level of water results in an objectionably low rate of saponification and an excessive reaction volume. If the amount of water is too low, it is difficult to obtain complete reaction due to high viscosity of the reaction mixture and reduced solubility of partially converted polymer.

An alcohol is produced as one product of the saponification reaction. When this is a water miscible alcohol such as methanol, it is preferred to retain most of this alcohol within the reaction zone throughout the saponification since this reduces the solubility of the polymer salt sufficiently to maintain the reaction mixture in an easily agitated slurry form. If the level of retained alcohol is too low, the polymer salt tends to form a viscous gel which is difficult to agitate and handle. While alcohol in excess of that generated by the reaction can be added, this is usually unnecessary for maintaining an easily agitated slurry.

In the saponification step, operation can be batch or continuous, and rates of addition of the reactants can vary widely. The best rate of addition can be determined by routine experimentation. A rate which is too high may cause unwanted agglomeration of solid particles, excessive foaming as solvent boils off, difficulty in temperature control, excessive accumulation of reactants, and other problems. A rate which is too low would result in excessive reaction volume for a given production rate, and could cause incomplete reaction if it results in too little time available for completion of the reaction after all reactants have been added.

Any number of methods can be used to recover the polymeric acetal carboxylate salt from the reaction mixture resulting from the saponification step. It is only necessary that the polymer not be exposed to conditions which would cause it to depolymerize, such as excessively low pH. It is preferred to maintain the pH above about 9.5, more preferably above about 10.0. The product can be recoverd as a solution, slurry, gel, wet cake, or dry solid, depending upon its intended use. If the product is dried, excessive exposure to high temperatures should be avoided since product degradation can result. It is preferred to recover the product in solid form.

By applying the methods and techniques disclosed herein, particularly those related to reduction in the number of unstable temporary endcaps present in the stabilized polymeric ester, surprisingly large improvements in active yield can be obtained, compared with those provided by the prior art. Active yields in excess of 75% of theory can be obtained, preferably greater than 80%, more preferably greater than 85%, even more preferably greater than 90%.

The following method for determining active yield can be used for preparations of sodium glyoxylate homopolymer,

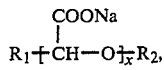

where $R_1$ and $R_2$ are stabilizing endgroups. For other salts and for polymers which include comonomers, analogous methods can be used, except that a different correlation between active polymer content and the calcium sequestration value of the polymeric acetal carboxylate composition must first be experimentally established for the particular polymer being considered.

In the case of the method for sodium glyoxylate homopolymer, the correlation between active polymer content (exclusive of endgroup weight) and calcium sequestration value was established by obtaining both calcium sequestration values and complete analyses for a number of compositions containing sodium glyoxylate homopolymer of varying chain lengths and then devising a formula to fit the data.

The formula developed is as follows:

$$S_x = 188.65\% \frac{(X-2)}{X}, X > 2 \qquad I$$

$$S_x = 0, X \leq 2$$

where $S_x$ is the calcium sequestration value, expressed as % of sodium tripolyphosphate (STPP) and X is the number average chain length of the polymer. According to this formula, as the chain length, X, approaches infinity, the amount of calcium sequestered approaches one mole per two moles of incorporated sodium glyoxylate, compared to one mole per mole of $Na_5P_3O_{10}$ in STPP and one mole per mole of $Na_4P_2O_7$ in STPP. For homopolymer chain lengths above about 40, this formula is believed to be accurate within about 5%. For shorter chain lengths it may be less accurate, since the shortest chain length used in developing the correlation was about 58.

Using the above formula, the weight of active sodium glyoxylate homopolymer present in a composition can be estimated as follows:

1. Determine the calcium sequestration value, $S_c$, and the weight, $W_c$, of the composition.
2. Determine the number average chain length of the active polyglyoxylate. This can be done by determining the number average molecular weight of the polymer of chain length three or higher, using any effective method, such as gel permeation chromatography; subtracting the average weight per chain of contained endgroups, which can be determined by nuclear magnetic resonance, and dividing the resulting number by 96.021, the molecular weight of the repeating glyoxylate unit.
3. Calculate the sequestration value, as % of STPP for pure polyglyoxylate of chain length X using Formula I.
4. Calculate the weight of active polymer, $W_a$, in the composition using the formula:

$$W_a = \frac{(W_c)(S_c)}{S_x}$$

Once the weight of active polymer in the composition is known, the active yield can be calculated using the formula:

$$Y_a = \frac{(W_a)(88.065)(100\%)}{(W_m)(96.021)}$$

where $W_m$ is the weight of methyl glyoxylate monomer which was used to produce the weight of the composition, $W_c$, which contains a weight of active polymer equal to $W_a$.

To determine the calcium sequestration value of the composition, $S_c$, required for the calculation of active yield, the following method can be used. In this method, the term "standard sodium tripolyphosphate (STPP)" refers to STPP containing 93.67% $Na_5P_3O_{10}$ and 5.70% $Na_4P_2O_7$. Either STPP of this composition should be used or the sesquestration values obtained should be corrected to a standard STPP basis before use.

A sample of the product is dissolved in deionized water to form a solution slightly more concentrated than 0.6% by weight, adjusted to pH 10.0 with 1 normal NaOH or HCl, and diluted to exactly 0.600% with deionized water. A portion of this solution is charged to the reservoir of an automatic tritrator equipped with a calcium selective electrode. Exactly 100 mls of $10^{-3}$M $CaCl_2$ solution, adjusted to pH 10.0 with 1 normal NaOH, is titrated with the sample solution with stirring at a titrant feed rate of 2 ml/minute. Titration is continued until well past the equivalence point of a titration curve on the recorder chart of the titrator, usually 10 ml or less of titrant. The titration procedure is repeated using a sample of standard sodium tripolyphosphate (STPP) in place of the product sample. For each of the two titrations, the equivalence point is determined graphically, and the number of ml of titrant required to reach the equivalence point is measured. The calcium sequestration activity of the product sample is then calculated as follows:

$$\% \text{ of } STPP = \frac{\text{ml } STPP \text{ solution to equiv. pt.}}{\text{ml product solution to equiv. pt.}} \times 100$$

Alternatively, if the Ca/Mg sequestration value of a sodium glyoxylate homopolymer composition has already been determined by the method of Matzner et al, TENSIDE, 10, No. 3 pp. 119-125 (1973), the calcium sequestration value for that composition can be read from the correlation curve presented in the FIGURE.

In the prior art examples, if the yield on a total weight basis is given or can be estimated, and if the number average chain length is given or can be estimated, and if a sequestration value is given, the active yield can be estimated as follows. If calcium/magnesium sequestration value is reported, use the FIGURE to determine the calcium sequestration value, $S_c$. Estimate the calcium sequestration value of the contained active polyglyoxylate, $S_x$, using Formula I, and the reported or estimated chain length. Finally, calculate the active yield, $Y_a$, using the following formula where $Y_w$ is the yield stated on a total weight basis.

$$Y_a = \frac{Y_w S_c}{S_x}$$

The following Examples are intended as illustrative, and are not intended to limit the scope of the current invention.

EXAMPLE 1

This Example illustrates the range of active yields which have been obtained by prior art processes for the preparation of polymeric acetal carboxylates. Table 1 presented below includes all examples found in a review of the prior art patents for which information was provided on both the amount of product produced from a given amount of monomer and the sequestration value of the product. In the event of republished examples, only one such example was included in Table 1. Where information on number average chain length of the product was not provided, an estimated value was used which is indicated in parenthesis in the table. In the Examples from U.S. Pat. No. 4,226,959, the yields on a total weight basis given in Table 1 are somewhat larger than those reported in the patent, since the yields in the patent were on an anhydrous basis, and the yields in Table 1 were adjusted to a hydrated basis to be consistent with the other data. The active yields indicated were calculated from the data provided in the prior art examples, using the methods described above. Inpection of the listed active yields reveals that the prior art processes provided in each case an active yield below about 75% of theory, and in most cases the active yield was not greater than 60%.

TABLE 1

Active Yields Provided by Prior Art Processes

| U.S. Pat. No. | Example Number | Total Weight of Product (% of Theory) | Chain Length | Ca/Mg Sequestration Value | Ca Sequestration Value | Active Yield |
|---|---|---|---|---|---|---|
| 4,144,226 | IX | 73 | (33) | 104 | 120 | 49% |
| 4,204,052 | IV, V | 73 | (20) | 77 | 103 | 47% |
| 4,224,420 | II, III | 20 | 20 | 114 | 123 | 14% |
| 4,225,685 | II | 86 | (30) | 114 | 123 | 60% |
| " | III | 89 | (30) | 115 | 123 | 62% |
| 4,226,959 | II | 78 | 200 | 128 | 127 | 53% |
| " | III | 80 | 76 | 135 | 129 | 56% |
| " | III | 80 | 86 | 91 | 113 | 49% |
| " | III | 78 | 125 | 89 | 112 | 47% |
| " | IV | 97 | 99 | 148 | 134 | 70% |
| " | IV | 103 | 58 | 128 | 127 | 72% |
| " | IV | 80 | 112 | 84 | 108 | 47% |
| " | IV | 59 | 75 | 62 | 90 | 29% |
| " | IV | 77 | 58 | 71 | 98 | 41% |
| 4,233,422 | II | 77 | (30) | 96 | 116 | 51% |
| 4,233,423 | II | 76 | 100 | 138 | 130 | 53% |
| " | III | 73 | 65 | 110 | 122 | 49% |
| " | IV | 15 | 45 | 112 | 122 | 10% |
| " | V | 20 | 75 | 117 | 124 | 13% |
| 4,315,092 | VIII | 73 | (30) | 78 | 104 | 43% |

EXAMPLE 2

This Example illustrates the preparation of polymeric acetal carboxylate at a high active yield in accordance with the present invention.

Crude polymerized methyl glyoxylate was distilled at 200 Torr pressure, 86° C. pot temperature, to produce methyl glyoxylate monomer for use in the preparation. An 18 inch insulated Vigreaux column was employed, and precautions were taken to exclude air from the system. The distillation rate was about 10 g./min., and about 66% of the material charged was recovered as a heart cut. To reduce monomer hold time, the distillate was collected in two portions, and the first portion was added to the polymerization zone while the second portion was being collected.

To a glass reactor equipped with a mechanical stirrer, thermometer, condenser, and dropping funnel was charged 500 ml of methylene chloride, 2.0 ml of water as a polymerization initiator, and 0.20 ml of triethylamine as a polymerization catalyst. To this heel was added dropwise, over two periods of 30–35 minutes each, mixtures containing a total of 2389 g of the freshly distilled methyl glyoxylate monomer and 500 ml of methylene chloride. Between additions there was a hold period of 90 minutes to wait for further distillation of monomer. During the additions, cooling was applied to limit the reaction temperature to a maximum of about 40° C. The batch was cooled to 25° C., and 10 ml of a 25% solution of diethyl aluminum chloride in hexane was added subsurface and stirred for 15 minutes to complete its dissolution and mixing. Next a mixture of 90 g of ethyl vinyl ether and 90 ml of methylene chloride was added over a 35 minute period, with cooling to maintain the reaction temperature about 30° C. Stirring was continued at about 30° C. for 90 minutes. A mixture of 1.0 ml of methanol and 10 ml of methylene chloride was added and stirred for 10 minutes. Next a mixture of 30 g of ethyl vinyl ether and 30 ml of methylene chloride was added over a 15 minute period, and stirring was continued for another 15 minutes. Then 1.0 ml of a 25% solution of diethyl aluminum chloride in hexane was added subsurface, and stirring was continued for 90 minutes. A mixture of 2.0 ml of methanol, 5.0 ml of triethylamine and 10 ml of methylene chloride was added, and stirring was continued for 15 minutes. Throughout all of the above operations, air was excluded by means of purging with nitrogen.

The stabilized polymeric ester solution resulting from the above operations was transferred to a dropping funnel. To a glass reactor equipped with two dropping funnels, a mechanical stirrer, thermometer, and distillate outlet was charged 672 g of 50% aqueous NaOH and 3328 g of water. This heel was heated to 45° C., and then the stabilized polymeric ester solution and a solution of 2535 g of 50% aqueous NaOH diluted with water to 3000 ml were added simultaneously over a period of 3 hours. During the addition, cooling was applied to limit the reaction temperature to 60° C., and methylene chloride was boiled off and not returned to the reactor. Transfer of the stabilized polymeric ester solution to the saponification reaction was completed by rinsing the addition funnel and polymerization reactor with methylene chloride and adding the rinsings to the saponification vessel. After the addition, stirring was continued for an hour. The product was cooled to about 25° C., and additional methanol was added to complete the precipitation of the product. The solid product was recovered by centrifugation, washed with a mixture of equal volumes of methanol and water, and dried at 40-45° C. at atmospheric pressure.

The resulting product weighted 2845 g and exhibited a calcium sequestration value of 150% of STPP. The molecular weight of the polymer was determined, and the calculated number average chain length of the polyglyoxylate chains was 155. The calculated active yield was 88% of theory, based upon the 2389 g of distilled monomer employed. Based upon the active yield obtained, it is concluded that less than about 12% of the polymer chains fed to the saponification step contained one or more unstable temporary endcaps.

EXAMPLE 3

This Example illustrates the effect of carboxylic acids introduced with the monomer.

Freshly distilled methyl glyoxylate monomer was prepared generally as in Example 2 except that the distillation pressure was increased to atmospheric pressure. Polymerization and polymer stabilization were carried out generally as in Example 2 except that the polymerization initiator was methanol instead of water and the final polymerization temperature was 0°-1° C. instead of 25° C. Hold time for the reaction of ethyl vinyl ether was increased to about 16 hours at 25°-31° C. Saponification and product recovery procedures were similar to those of Example 2. The resulting active yield was about 93% of theory. This procedure was repeated except that 0.1 g of formic acid per 100 g of monomer was added to the reactor during monomer addition. This represents about 0.0019 moles of formic acid per mole of methyl glyoxylate monomer. In this case, the resulting active yield was reduced to 77% of theory. This yield decline is about the amount expected if the added formic acid were converted entirely to unstable temporary endcaps which entered the saponification step.

EXAMPLE 4

This Example further illustrates the preparation of polymeric acetal carboxylate at a high active yield in accordance with the present invention.

Freshly distilled methyl glyoxylate monomer was prepared generally as in Example 2. To a glass reactor equipped with a mechanical agitator, thermometer, rubber septum, and nitrogen purging system was charged 195 g of the monomer and 60 ml of methylene chloride. After mixing and cooling the reactor contents to 5° C., 1.6 ml of a 0.05% solution of sodiodiethylmethyl malonate in tetrahydrofuran was injected over an 18 minute period. Even with ice cooling the reaction temperature during this addition reached a peak of 55° C. The batch was cooled to 27°-30° C. and then stirred 30 minutes at that temperature. About 1.1 ml of a 25% solution of diethyl aluminum chloride in hexane was then injected and stirring was continued for 10 minutes at 28° C. Next 15 ml of methylene chloride was added followed by 10.4 ml of ethyl vinyl ether by subsurface injection. The temperature rose to 33° C., and agitation was continued for 120 minutes. The polymeric ester solution resulting from the above operations was transferred to a dropping funnel. To a glass reactor equipped with two dropping funnels, a mechanical stirrer, thermometer, and distillate outlet was charged 27.2 g of 50% aqueous NaOH and 400 ml of water. This heel was heated to 45° C., and then the polymeric ester solution and a solution prepared by mixing 181 g of 50% aqueous NaOH and 106 ml of water were added simultaneously, with methylene chloride boiling off over a period of 38 minutes. Temperature of the reaction mixture was maintained in the range 45°-55° C. during the addition and another 15 minutes of stirring. Then the mixture was cooled to 25° C. and held overnight with stirring. The product was recovered by methanol precipitation, filtration, methanol washing, and vacuum drying at 40° C.

The resulting product had a calcium sequestration value of 150% of STPP, and the active yield was 89%. The preparation was repeated, and again the active yield was 89%. Based upon this active yield, less than about 11% of the polymer chains fed to the saponification step contained unstable temporary endcaps.

EXAMPLE 5

This Example illustrates the effect of impurities in the monomer resulting from oxygen exposure.

Polymeric acetal carboxylate was prepared from methyl glyoxylate monomer as in Example 4 except that the monomer was believed to have been exposed to abnormally high levels of oxygen during distillation prior to the polymerization step, based upon the presence of high levels of impurities known to result from oxygen exposure. The active yield was only 35% of theory, compared to 89% observed in Example 4 when such oxygen exposure was avoided. Most of this decline in yield is believed to have resulted from unstable temporary endcap precursors in the monomer which had been more exposed to oxygen.

EXAMPLE 6

Additional batches of polymeric acetal carboxylate were prepared using the general procedures of Examples 2-4, with some variation of the conditions. Information on conditions which were varied and the resulting active yields is presented in Table 2 below. This further illustrates the high active yields which can be obtained by the process of this invention. It also illustrates that considerable variation of process conditions can occur without departing from the spirit of the present invention. In Table 2, the following abbreviations are used: TEA for triethylamine and EVE for ethyl vinyl ether. In each run in Table 2, it is estimated that no more than 16% of the polymer chains fed to the saponification step contained unstable temporary endcaps. In some batches small amounts of water and alcohol are added during the stabilization step. In some instances water or alcohol may destroy unstable temporary endcaps formed earlier in the process.

TABLE 2

| Batch No. | 1 | 2 | 3 | 4 | 5 | 6 |
|---|---|---|---|---|---|---|
| Monomer Distillation Pressure, Torr | 200 | 760 | 200 | 200 | 200 | 180 |
| Polymerization Catalyst | NaOH | TEA | TEA | TEA | TEA | TEA |
| Added Poly- | $H_2O$ | $CH_3OH$ | $H_2O$ | $H_2O$ | $H_2O$ | $CH_3OH$ |

TABLE 2-continued

| | | | | | | |
|---|---|---|---|---|---|---|
| merization Initiator | | | | | | |
| Final Polymerization Temperature, °C. | 27 | 10 | 27 | 27 | 25 | 27 |
| Addition Sequence for Polymer Stabilization | Et₂AlCl EVE CH₃OH EVE | Et₂AlCl EVE CH₃OH | Et₂AlCl EVE H₂O Et₂AlCl EVE CH₃OH/TEA | Et₂AlCl EVE CH₃OH EVE TEA | Et₂AlCl EVE CH₃OH EVE Et₂AlCl CH₃OH/TEA | EVE Et₂AlCl EVE CH₃OH/TEA |
| % Excess NaOH | 50 | 35 | 50 | 50 | 50 | 41 |
| Hydrolysis Temperature, °C. | 45–47 | 40–53 | 45–50 | 45–50 | 60 | 55–60 |
| Active Yield % of Theory | 84 | 92 | 89 | 88 | 89 | 89 |

| Batch No. | 7 | 8 | 9 | 10 | 11 |
|---|---|---|---|---|---|
| Monomer Distillation Pressure, Torr | 180 | 180 | 760 | 760 | 760 |
| Polymerization Catalyst | TEA | TEA | TEA | TEA | TEA |
| Added Polymerization Initiator | CH₃OH | CH₃OH | CH₃OH | CH₃OH | CH₃OH |
| Final Polymerization Temperature, °C. | 27 | 27 | 0 | 9 | 0 |
| Addition Sequence for Polymer Stabilization | EVE Et₂AlCl EVE | EVE Et₂AlCl CH₃OH | EtAlCl₂ EVE CH₃OH | EVE Et₂AlCl EVE CH₃OH | Et₂AlCl CH₃OH EVE CH₃OH |
| % Excess NaOH | 41 | 41 | 10 | 35 | 40 |
| Hydrolysis Temperature, °C. | 55–60 | 55–60 | 45–62 | 42–52 | 50–55 |
| Active Yield % of Theory | 85 | 88 | 91 | 92 | 92 |

We claim:

1. In a process for producing a polymeric acetal carboxylate salt comprising the steps of:
   (a) bringing together in a reaction zone under polymerization conditions an ester of glyoxylic acid and a polymerization promoter, to produce a polymeric acetal ester;
   (b) adding to said polymeric acetal ester a stabilizing endgroup precursor to add stabilizing endgroups to the polymeric acetal ester to produce a stablized polymeric acetal ester; and
   (c) saponifying said stabilized polymeric acetal ester with an alkali metal hydroxide to produce the corresponding alkali metal polymeric acetal carboxylate salt;
the improvement which comprises providing step (c) with a polymer wherein the number of polymer chains which contain at least one unstable temporary endcap does not exceed about 25% of the total number of polymer chains entering step (c), whereby the active yield of alkali metal polymeric acetal carboxylate salt is at least about 75% based upon the amount of said ester of glyoxylic acid.

2. The process of claim 1 wherein the polymeric acetal carboxylate salt is a glyoxylate homopolymer.

3. The process of claim 1 in which the ester of gloxylic acid has 1 to 4 carbon atoms in the alkoxy group.

4. The process of claim 3 in which the ester of glyoxylic acid is methyl glyoxylate.

5. The process of claim 1 in which a catalyst is added in the polymer stabilization step, (b).

6. The process of claim 1 in which the stabilizing endgroup precursor added in step (b) is an alkyl vinyl ether, and in which an acidic catalyst is added in the polymer stabilization step, (b).

7. The process of claim 6 in which the alkyl vinyl ether is ethyl vinyl ether.

8. The process of claim 1 in which the alkali metal hydroxide employed in the saponification step, (c), is selected from the group consisting of sodium hydroxide, potassium hydroxide, and mixtures thereof.

9. The process of claim 1 wherein the ester of glyoxylic acid is protected from exposure to oxygen prior to and during step (b) whereby unstable temporary endcaps formation is reduced.

10. The process of claim 9 wherein step (c) is provided with a polymer wherein the number of polymer chains which contain at least one unstable temporary endcap does not exceed about 5% of the total number of polymer chains entering step (c).

11. The process of claim 9 wherein the ester of glyoxylic acid contains less than 0.1 mole % unstable temporary endcap precursors.

12. The process of claim 9 wherein the ester of glyoxylic acid contains less than 0.1 mole % of carboxylic acids or reactive derivatives of carboxylic acids.

13. The process of claim 9 in which the total amount of unstable temporary endcap precursors entering the reaction zone prior to and during step (b) is less than 0.001 mole per mole of glyoxylate ester monomer.

14. The process of claim 13 in which the total amount of unstable temporary endcap precursors is less than 0.0002 mole per mole of glyoxylate ester monomer.

15. The process of claim 9 in which in step (a) the glyoxylate ester monomer employed is distilled directly into a reaction zone containing the polymerization promoter.

16. The process of claim 1 in which the amount of unstable temporary endcaps formed during processing, beyond the amount formed from unstable temporary endcap precursors in the starting materials, is less than 0.0002 mole per mole of monomer.

17. The process of claim 1 in which number average chain length of the polymer is from about 25 to about 150.

18. The process of claim 1 in which a comonomer is added to the reaction zone to produce a polymeric acetal ester that is a copolymer.

19. The process of claim 6 wherein the polymeric acetal ester of step b is protected from exposure to temperatures in excess of about 40° C. prior to step (c).

20. The process of claim 6 wherein the acidic catalyst is an alkyl aluminum chloride and the amount of acidic catalyst added in step (b) does not exceed about 0.001 mole per mole of the ester of glyoxylic acid.

21. A process which comprises:
(a) bringing together in a reaction zone under polymerization conditions a $C_1$–$C_4$ alkyl ester of glyoxylic acid and a polymerization promoter, to produce a polymeric acetal ester wherein the reaction mixture and the ester of glyoxylic acid are protected from exposure to oxygen;
(b) adding to said polymeric acetal ester a lower alkyl vinyl ether and a catalyst to add stabilizing endgroups to the polymeric acetal ester to produce a stabilized polymeric acetal ester wherein the reaction mixture is protected from exposure to oxygen; and
(c) saponifying said stabilized polymeric acetal ester with sodium hydroxide to produce a sodium polymeric acetal carboxylate salt of number average chain length in the range of about 5–200 glyoxylate units with an active yield of at least about 80% based upon said ester of glyoxylic acid.

22. The process of claim 21 in which the $C_1$–$C_4$ alkyl ester of glyoxylic acid is methyl glyoxylate.

23. The process of claim 21 in which the lower alkyl vinyl ether is ethyl vinyl ether.

24. The process of claim 21 in which the total amount of unstable temporary endcap precursors entering the reaction zone prior to step (c) is less than 0.0004 mole per mole of monomer.

25. The process of claim 21 in which triethylamine is a polymerization catalyst.

26. The process of claim 21 in which methylene chloride is employed as a solvent.

27. The process of claim 21 in which an organo aluminum compound is used as a catalyst for the addition of the stabilizing endgroups, in step b.

28. The process of claim 21 in which saponification is carried out at a temperature from about 45° to about 65° C.

29. The process of claim 21 in which the polymerization step, a., is conducted within a temperature range from about 0° to about 50° C.

30. The process of claim 21 in which the glyoxylate ester monomer entering the polymerization zone contains less than 0.04 mole % of carboxylic acids or reactive derivatives of carboxylic acids.

31. The process of claim 27 wherein the polymeric acetal ester of step (b) is protected from exposure to temperatures in excess of 40° C. prior to step (c).

32. The process of claim 21 wherein in step (a) the glyoxylate ester monomer employed is distilled directly into a reaction zone containing the polymerization promoter.

33. The process of claim 1 wherein the ester of glyoxylic acid is distilled and thereafter protected from hydrolysis, exposure to oxygen and elevated temperatures prior to introduction into step (a).

34. The process of claim 33 wherein the ester is distilled immediately prior to introduction into step (a) whereby storage time prior to step (a) is reduced.

35. The process of claim 34 wherein the ester is distilled directly into the polymerization zone.

36. The process of claim 33 wherein the ester is protected from hydrolysis by minimization of water content.

37. The process of claim 1 wherein the monomer is added to the reaction zone containing the polymerization promoter.

38. The process of claim 1 wherein an acidic endcapping catalyst is employed in step (b) and wherein the amount of time lapse after addition of said catalyst and before addition of the stabilizing endgroup precursor is reduced or eliminated whereby formation of unstable temporary endcaps is reduced.

39. A process which comprises:
(a) bringing together in a reaction zone protected from exposure to oxygen and maintained at from about 0° to about 50° C. under polymerization conditions a reaction mixture comprising methyl glyoxylate, a polymerization promoter, a solvent, and not more than about 0.001 mole of unstable temporary endcap precursors per mole of methyl glyoxylate to produce a polymeric acetal ester;
(b) adding to said polymeric acetal ester an alkyl aluminum chloride and a lower alkyl vinyl ether, within a temperature range from about 0° to about 40° C. to add stabilizing endgroups to the polymeric acetal ester, to produce a stabilized polymeric ester in which the number of polymer chains containing at least one unstable temporary endcap does not exceed about 15% of the total number of polymer chains present; and
(c) saponifying said stabilized polymeric acetal ester with sodium hydroxide at a temperature from about 45° C. to about 65° C. to produce the corresponding sodium polymeric acetal carboxylate salt with a number average chain length from about 5 to about 200 whereby the active yield of the salt is at least about 85% based upon said methyl glyoxylate.

* * * * *